UNITED STATES PATENT OFFICE.

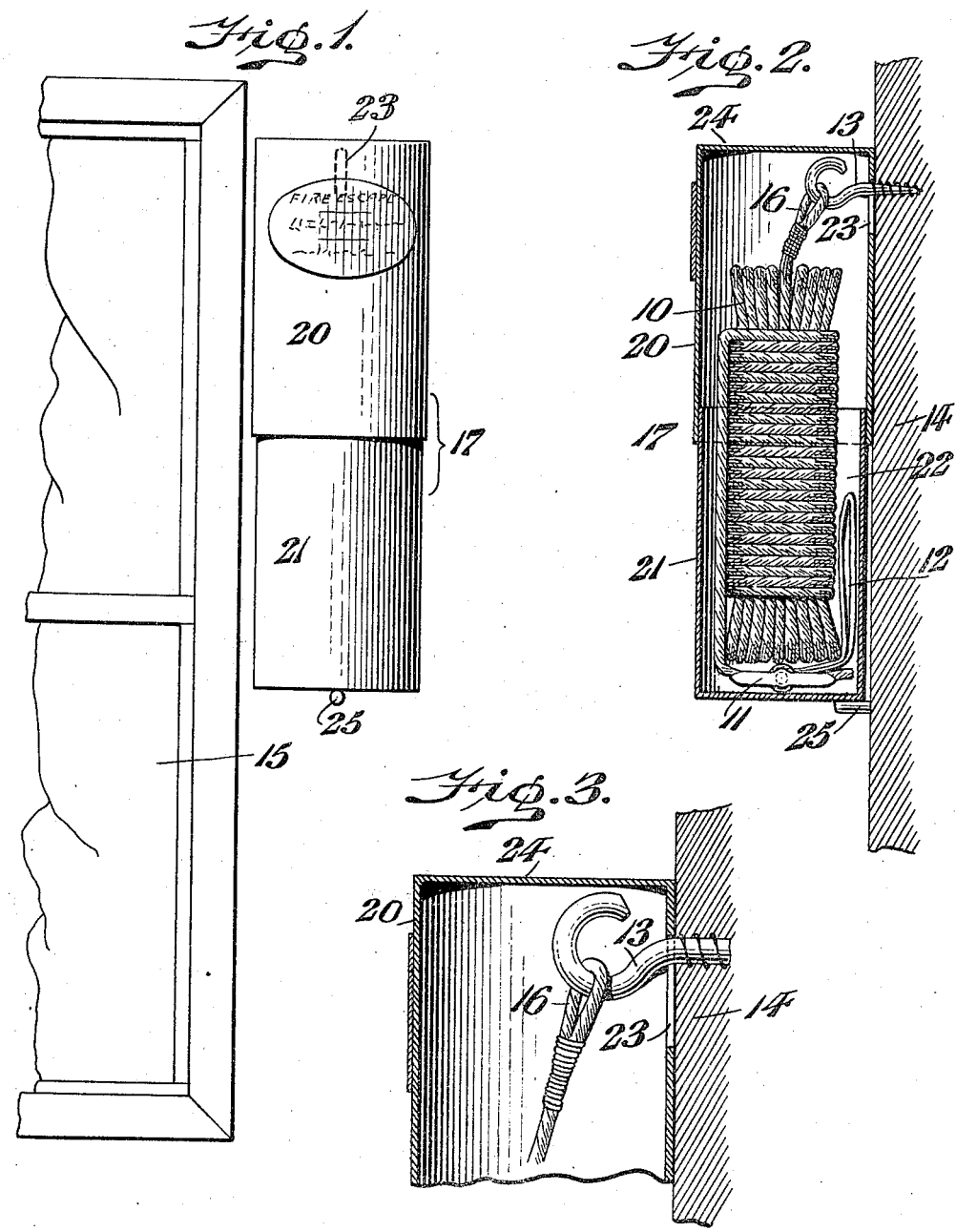

ABRAM L. PLUSH, OF PHILADELPHIA, PENNSYLVANIA.

RECEPTACLE FOR FIRE-ESCAPES.

1,300,870. Specification of Letters Patent. Patented Apr. 15, 1919.

Application filed January 17, 1919. Serial No. 271,656.

*To all whom it may concern:*

Be it known that I, ABRAM L. PLUSH, a citizen of the United States, residing in Philadelphia, county of Philadelphia, and State of Pennsylvania, have invented a certain new and useful Improvement in Receptacles for Fire-Escapes, of which the following is a specification.

Some of the objects of the present invention are to provide means for holding and concealing a fire-escape apparatus when not in use; to provide means instantly operative to release a fire-escape for use, when needed; to provide a container arranged to prevent exposure of a rope or cable fire-escape to atmospheric conditions in its normally inoperative position; to provide a container which is normally sealed to prevent vermin and rodents from having access to the apparatus; and to provide other improvements as will hereinafter appear.

In the accompanying drawings Figure 1 represents one form of the present invention, the same being shown in front elevation; Fig. 2 represents a longitudinal section of the same; and Fig. 3 an enlarged detail of a portion of the receptacle.

Referring to the drawings one form of fire-escape apparatus is shown comprising a rope or cable 10, of any suitable material having a length sufficient to reach from a point of suspension to the ground or other landing place and provided with a friction block or movable carrier 11 from which a life-belt 12, of any well known form, is supported.

For supporting the cable 10 at its upper end a hook or other suitable fixture 13 is rigidly secured to a wall 14 or the like in close proximity to an opening 15, such as a window, or other suitable outlet, and to this hook 13 the cable 10 is removably secured by means of a loop or eye 16.

In order to protect the cable 10, when not in use, so that it may be always in safe condition a receptacle 17 is provided, one form of which consists, preferably, of a cylindrical casing having upper and lower body sections 20 and 21 arranged to interfit to form an inclosed substantially air-tight chamber 22, in which the escape is coiled in such a manner that it may drop out immediately upon removal of the section 21 and its free end then be thrown out of the opening 15.

For the purpose of maintaining the coiled escape fast at the loop end, the upper casing section 20 is provided with a slot 23 arranged in relatively close proximity to the closed end 24 of the section 20 and through which the hook 13 extends into the chamber 22. The slot 23 is preferably of a width to fit snugly about the shank of the hook 13, while its length is sufficient to permit movement of the upper section 20 relative to the hook 13. The construction is such that, normally, the space between the end of the hook 13 and the body end 24 is considerably less than the thickness of the loop forming material and consequently the loop 16 is prevented from working over and off of the hook 13 and can only be removed manually after lifting the section 20 to provide the space necessary to slip the loop 16 out of engagement with the hook 13.

In order to support the lower section 21 in such a manner that it can be readily disconnected from its other part without providing a catch, a lock or other fastening device which would cause delay and difficulty at a time of danger, there is provided a rigid support 25, such as a pin or other suitable means adapted to be fixedly secured to the wall 14 and project laterally therefrom to form a seat for the inner bottom edge of the section 21. This support 25 holds the section 21 in position to interfit with the upper section 20 and effectually seals the container, but its length is such that the container can be swung outwardly to free the lower end so that the lower section 21 can be quickly and easily removed from the upper section 20 to release the escape without loss of time.

In Patent 1,246,655 a form of receptacle is shown wherein a hinged closure is provided for the purpose of inclosing the fire-escape when not in use, but under the increasing restrictions and regulations for fire protection it has become necessary to provide means for retaining the escapes ready for instant use and always operative as a life saving means. In the operation of the aforesaid patented device it has been found in practice that the hinged door is often left open, sometimes becomes broken off or bent so that it will not close at all and the result is that the escape becomes damaged and unfit for service. In the receptacle of the present invention the parts are always connected to maintain the escape concealed and sealed ready for use, protected from deterioration and not subject to interference from meddlers and the like. The present construction not only meets the most rigid requirements of the fire regulations but is a simple, inexpensive and successful receptacle, the utility of which has been instantly recognized.

While in the foregoing the receptacle has been referred to as of cylindrical form it will be understood that this is only by way of example and the invention is not limited in any way to the exact shape or size here shown, since obviously the device may be made of any shape suitable for the purpose intended.

Having now fully described the present invention what I claim and desire to secure by Letters Patent:—

1. A fire-escape apparatus comprising in combination, a hook arranged to be rigidly secured to a fixed support to suspend a fire-escape of the rope type, and a receptacle for said fire-escape comprising two interfitting sections, one of said sections having an opening to receive said hook, and means to support the other section in interfitting position but leaving the receptacle free to swing laterally, whereby said sections can be disconnected to release said fire-escape.

2. A fire-escape apparatus comprising in combination, a hook arranged to be rigidly secured to a fixed support to removably carry a loop of a fire-escape of the rope type, and a receptacle for said fire-escape comprising two interfitting sections, one of said sections having an opening to receive said hook, said opening being located in close proximity to a closed end of said section to form a restricted passage of less diameter than the material of said loop to prevent said loop becoming detached from said hook in operative condition, and means to support the other section in interfitting position but leaving the receptacle free to swing laterally, whereby said sections can be disconnected to release said fire-escape.

3. A fire-escape apparatus comprising in combination a fixture arranged to be rigidly secured to a support to suspend a fire-escape of the rope type, and a receptacle for said fire-escape comprising two interfitting sections, one of said sections having an opening to receive said fixture, and means to removably support the other section in interfitting position.

4. A fire-escape apparatus comprising in combination, a fixture arranged to be rigidly secured to a support to suspend a fire-escape of the rope type, and a receptacle for said fire-escape comprising two detachable sections, one of said sections having an opening to receive said fixture, and rigid means to removably support the other section, whereby in operative condition the two sections form an inclosed compartment.

5. A fire-escape apparatus comprising in combination, a hook arranged to be rigidly secured to a support to suspend a fire-escape of the rope type, and a receptacle for said fire-escape comprising two sections arranged one above the other and having interfitting connection, one of said sections having an opening to receive said hook so that said receptacle seats flush against said support to close said opening, and a rigid laterally disposed pin secured to said support to form a seat for the lower section of said receptacle, whereby said receptacle can be swung away from said pin for removal of said lower section.

Signed at Philada., in the county of Philada. and State of Penna., this 15 day of Jan., A. D. 1919.

ABRAM L. PLUSH.